United States Patent
Gea Aguilera et al.

(10) Patent No.: US 11,859,534 B2
(45) Date of Patent: Jan. 2, 2024

(54) PROFILED STRUCTURE AND ASSOCIATED TURBOMACHINE

(71) Applicant: Safran Aircraft Engines, Paris (FR)

(72) Inventors: Fernando Gea Aguilera, Moissy-Cramayel (FR); Mathieu Simon Paul Gruber, Moissy-Cramayel (FR); Georges Jean Xavier Riou, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 569 days.

(21) Appl. No.: 16/969,738

(22) PCT Filed: Feb. 15, 2019

(86) PCT No.: PCT/FR2019/050350
§ 371 (c)(1),
(2) Date: Aug. 13, 2020

(87) PCT Pub. No.: WO2019/158876
PCT Pub. Date: Aug. 22, 2019

(65) Prior Publication Data
US 2021/0003074 A1  Jan. 7, 2021

(30) Foreign Application Priority Data

Feb. 16, 2018 (FR) ...................... 1851360

(51) Int. Cl.
*F02C 7/045* (2006.01)
*B64C 3/10* (2006.01)
*B64C 11/18* (2006.01)
*B64C 21/10* (2006.01)
*F02K 1/34* (2006.01)
*B64D 33/02* (2006.01)
*F01D 9/04* (2006.01)

(52) U.S. Cl.
CPC ............... *F02C 7/045* (2013.01); *B64C 3/10* (2013.01); *B64C 11/18* (2013.01); *B64C 21/10* (2013.01); *B64D 33/02* (2013.01); *B64D 33/06* (2013.01); *F01D 9/041* (2013.01); *B64D 2033/0206* (2013.01); *F05D 2260/96* (2013.01)

(58) Field of Classification Search
CPC ....................... B64D 33/06; B64D 2033/0206
See application file for complete search history.

(56) References Cited

U.S. PATENT DOCUMENTS

| 1,862,827 | A |  | 6/1932 | Parsons et al. |
| 4,829,813 | A | * | 5/1989 | Syed ................ G01P 5/175 |
|  |  |  |  | 73/112.01 |
| 2017/0145990 | A1 | * | 5/2017 | Drack ................ F03D 1/0641 |
| 2017/0226865 | A1 | * | 8/2017 | Kray ................. F01D 9/041 |

FOREIGN PATENT DOCUMENTS

| WO | WO 2013/092368 A1 | 6/2013 |
| WO | WO 2013/130163 A1 | 9/2013 |
| WO | WO 2015/193654 A1 | 12/2015 |
| WO | WO 2016/184619 A1 | 11/2016 |

* cited by examiner

*Primary Examiner* — Richard Green
*Assistant Examiner* — Ashesh Dangol
(74) *Attorney, Agent, or Firm* — Blank Rome LLP (57) ABSTRACT

An airflow profiled structure having a profiled leading edge. The profiled leading edge having, along a leading edge line, a serrated profile line with a succession of teeth and depressions. The airflow profiled structure also includes a porous acoustically absorbent region located towards the bottom of the depressions.

19 Claims, 3 Drawing Sheets

PROFILED STRUCTURE AND ASSOCIATED TURBOMACHINE

CROSS REFERENCE TO RELATED APPLICATIONS

This application is a national phase of PCT/FR2019/050350, filed Feb. 15, 2019, which claims the benefit of French Application No. 1851360, filed Feb. 16, 2018, the subject matter of each of which are incorporated by reference herein in their entirety.

INTRODUCTION

This invention relates to the field of the aero-acoustic management of aerodynamic profiled structures such as, for example, stationary or rotating blades in an aircraft turbomachine or in a test bench for such turbomachines, or on a primary air intake slat of the turbomachine.

This type of stationary blade is found, for example, on OGV (outlet guide vane) outlet guide vanes, or rectifiers, arranged downstream of a rotating body to straighten the airflow.

An example will be given for a ducted-fan turbine engine with a fan (front) and a downstream guide vane arranged in a secondary section.

Particularly in the Ultra-High Bypass Ratio turbofan engines (UHBR; ultra-high dilution ratio fairing fan engine configuration, above 15), it is envisaged to increase the diameter of the fan and reduce the length of the suspension pod fixed to the aircraft, thus reducing the distance between the fan and the intake guide vanes of IGVs (Inlet Guide Vanes), the OGVs and the primary air intake slat. In this type of engine, the interaction of the wake of the fan with the IGVs, the OGVs and the slat is one of the dominant broad band sources of noise.

Beyond this observation in a turbomachine, other areas of turbomachines, but also aerodynamically profiled structures (wings, open-rotor blades—open rotor, etc.) are confronted with problems of aero-acoustic management.

For this reason, the use of profiled airflow structures has already been proposed, for example in WO 2016/184619:
- comprising a body and porous acoustically absorbent regions,
- having an upstream, a downstream, an upstream leading edge and/or a downstream profiled trailing edge, and
- having, along a leading edge line and/or a trailing edge line, a serrated profile line thus showing (provided with) a succession of teeth and depressions.

Thus, this serrated profile line extends along the leading and/or trailing edge, i. e. in the direction of the elongation of the structure at the leading edge and/or trailing edge.

Especially on reduced chord profiles, but also on closed profiles—(line of) leading edge and/or (line of) trailing edge along a line or direction of elongation closed on itself, along a perimeter, as on a turbomachine primary air intake slat—, noise is mainly produced at the leading and/or trailing edge, more precisely at the depressions of the serrations where pressure fluctuations are more intense.

As regards the term "chord" used in this text, it should be noted that if there is no strictly a "chord" as in the case of a slat (identified 16 below) separating the primary and secondary flows, the expression "in the direction of the chord (identified 40 below) of the profile" will be considered as corresponding to the direction of what is referred to below as the "general axis (X)" or "X axis", namely the axis along which the fluid flow generally flows over the profiled structure concerned, this axis being typically:
- the longitudinal axis of the turbomachine (axis of revolution) and/or aircraft involved,
- and/or transverse, or even perpendicular, to the elongation of the profiled structure, which extends in said "direction of elongation".

It will be understood that the expression "transverse" does not imply a strict perpendicularity.

The invention aims at attenuating the above-mentioned locally intense pressure fluctuations by using a porous surface (or an acoustic treatment) at the depressions of the serrations.

It is thus proposed that, on the above-mentioned profiled structure, said porous acoustically absorbent regions form, locally, bottoms for the depressions and thus define, together with the body, the serrated profile line at the leading and/or trailing edge of the profiled structure.

In order to maximise noise reduction, it may be helpful if the geometric centre of the acoustically treated or porous surface region is placed at a distance downstream of the leading and/or trailing edge of the profile under consideration, depending (i.e. as close as possible) on the position where pressure fluctuations are at their maximum.

Thus it is recommended:
- that, in the direction of the chord, the serrations profile has a maximum amplitude, h, and
- that said geometrical centre of the porous acoustically absorbent region is located at a distance d downstream of the profiled leading and/or trailing edge at the bottom of the depressions such that:

$$d=h/10, \text{ within } 30\%.$$

One advantage is that the thickness of the profile structure, such as a vane, is taken into account, which causes the region where pressure fluctuations on the surface of the profile structure are greatest to move downstream of the depression.

In the present text, all dimensions (d, h, etc.) are to be considered at the same scale, in meters.

For similar considerations, and/or in order to optimise the surface to be treated to reduce acoustic radiation, it is furthermore proposed:
- that, in the direction of the leading and/or trailing edge line, the serrated profile line has a distance between two consecutive tooth tips (hereinafter $\lambda$, $\lambda 1$, $\lambda 2$), and
- that the porous acoustically absorbent region has:
  - in the direction of the leading and/or trailing edge line, two limits separated by a distance a such that a is equal to one third of said distance between two consecutive tooth tips, to within 30%,
  - in the direction of the chord, two limits separated by a distance b such that b=h/3, within 30%.

One advantage is that the acoustic treatment or porous surface will be placed where the pressure fluctuations on the vane surface are at their maximum, thus optimizing the surface to be treated to reduce acoustic radiation.

In terms of material solutions to be used, it is proposed:
- that the porous acoustically absorbent region under consideration comprises a porous foam having pores with a cross-section smaller than said distance a/4 or b/4, at the surface (i.e. at the surface) of said profiled leading and/or trailing edge of the profiled structure, and/or
- that said region comprises, on the surface of said profiled leading and/or trailing edge of the profiled structure, a micro-perforated sheet or resonant cavities covering a porous foam having pores with a cross-section smaller than said distance a/4 or b/4.

The advantage is to reduce pressure fluctuations and thus noise levels, since the size of the cavities will influence the frequency range to be attenuated.

In addition, it may be preferred that said porous acoustically absorbent region include a Helmholtz resonator.

In fact, the operation of Helmholtz resonators, in which the depth of the cavities is closely related to the target frequency to be attenuated, can be found on other parts of a turbojet engine, such as on acoustic nacelle treatments.

As already noted, it is in particular in connection with aircraft that the invention finds its application.

It is therefore specified that the profiled structure will be advantageously one of:
- an aircraft and turbomachine structure with an upstream fan (i.e., a fan located partly upstream of the turbomachine), or,
- an aircraft wing, an aircraft wing slat or flap, an aircraft engine support pylon, a fin, an aircraft stabilizer, a helicopter blade, a propeller, or
- of the following parts of turbomachinery adapted to power an aircraft:
  - a leading and/or trailing edge of an annular air flow separating wall, downstream of a fan of the turbomachine, between a primary flow and a secondary flow,
  - first fixed primary flow (Fp) guide vanes,
  - second fixed secondary flow (Fs) guide vanes.

Indeed, in the above cases, the presence of such a proposed serrated profile line allows to deal with a delicate problem linking static (presence of air inlet structures, blades . . . ) and dynamic (blade rotation, taking into account certain flight configurations . . . ) aero-acoustic management issues, all the more so with an upstream fan turbomachine on which the acoustic/aerodynamic interference problems are very complex, and the generated noise is significant.

In this respect, it was found that the acoustically absorbent porous region should target the place where the interaction noise with the wake turbulence is generated. Thus, we will be able, via the solutions proposed here:
- to optimise the surfaces to be treated, by limiting their extent, thus making it possible to limit the aerodynamic losses induced by the presence of these acoustically absorbent porous regions which disturb the fluid flows,
- to reduce the masses involved, for example through the cavities in the porous surface or the low density of the acoustic treatments,
- to limit manufacturing costs compared to structures with acoustic treatment present on very large surfaces.

In terms of shape, it is proposed that the teeth and depressions of the serrated profile line should individually have a wavy shape, with rounded or more sharp tops.

Indeed, these forms have proven to be effective.

Rounded tops reduce locally high concentrations of mechanical stress, thus increasing the service life of the part.

Sharp tops provide increased noise reduction.

In addition, the provision of individually shaped teeth and depressions with locally rectilinear side walls makes it possible to introduce a certain decorrelation between the noise sources along the leading and/or trailing edge.

The air flow generated axially (X-axis hereafter, also referred to as the general axis) downstream of a rotating structure, such as downstream of a turbo machine fan towards a primary airflow nozzle, or which may be influenced by a disturbing structure, such as an aircraft fuselage in relation to a wing, or a drift with respect to a stabilizer, is swirling and is strongly influenced by a direction of rotation of the air or by that of the fan, especially since repeated passages of the fan blades in the air flow or certain conditions of contact with the "disturbing structure" create shock waves. In the case of the fan blades, this leads to the formation of harmonic lines in the rotational frequency of the motor shaft.

In order to take account of these phenomena and to ensure that the tooth surfaces can be as fully active as possible in the expected acoustic effect, it is proposed that the individual teeth develop at an angle to a parallel to said general axis (X).

In the case of a fan rotation, the teeth will be inclined so as to be oriented towards the direction of rotation—generally oblique with respect to said X axis—of the rotating flow thus generated by the fan.

In other words:
- the fan (upstream) is adapted to rotate in a predetermined direction about said general axis (X) so that the air flow downstream of the fan is generally obliquely oriented with respect to said axis (X),
- the teeth can then be inclined (laterally) circumferentially around said general axis (X) towards the generally oblique orientation of the air flow downstream of this fan, to face it generally.

In particular, a limiting effect of acoustic impact on the IGVs was noted.

In this case, the teeth will in fact be individually non-symmetrical in relation to a perpendicular to the line of the profiled leading and/or trailing edge passing through the tooth in question.

Another way of presenting things will be to consider that, from a first location (such as from a first end, or from a defined area on a perimeter) to a second location (such as a second end, opposite to the first, or another area along the perimeter), the teeth of the serrated profile line will be individually inclined (laterally) towards the second location.

In principle, the inclination will be the same for all the teeth. However, the teeth may have heterogeneous inclinations, different in different places.

If we are rather along the leading and/or trailing edge extension of a said structure of type blade (of rotor or stator), blade (of a propeller for example) or wing (of an aircraft for example), the profiled structure:
- which will have a span along the leading and/or trailing edge line between a first end and a second end,
- will then have said tooth inclinations each oriented towards one of the extremities.

The invention will be better understood, if need be, and other details, characteristics and advantages of the invention will appear upon reading the following description given by way of a non restrictive example while referring to the appended drawings.

DETAILED DESCRIPTION

Figure 1:
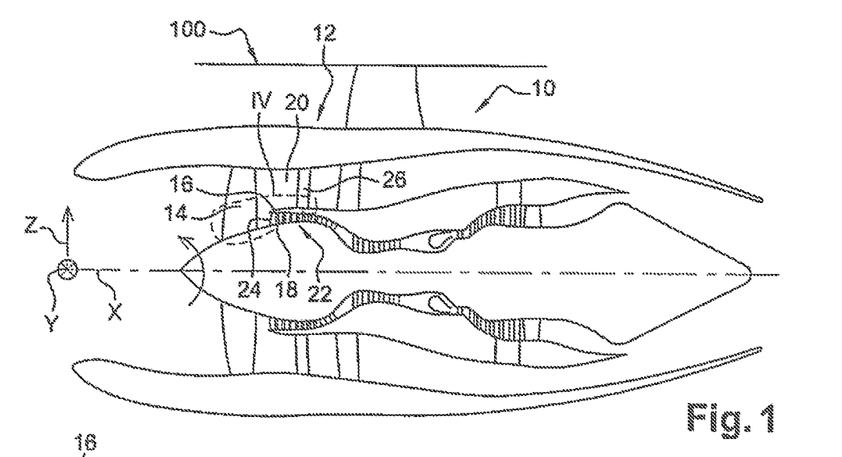
FIG. 1 is a longitudinal cross-sectional view (X axis) of a typical turbomachine for an aircraft.

Referring to FIG. 1, an aircraft 100 turbojet 10 is schematically represented and defined as follows:

The pod 12 is used as the outer casing for the various components, including, at the front (left in FIG. 1), an upstream fan 14 (AM).

Downstream (AV) of the fan 14, the airflow (locally schematised in 38 in FIG. 4) is separated by the separator slat 16 of an annular wall 160 into a primary airflow and a secondary airflow. The primary airflow flows through an internal annular air passage or primary jet 18 when entering the low-pressure compressor 22 at the intake guide vanes 24 IGV, also called first vanes. The secondary airflow is diverted by the separator slat 16 into an external annular air passage 20 (secondary jet) towards the outlet guide vanes 26 OGV, also called secondary vanes, and then towards the engine outlet.

Figures 2, 3, 4:
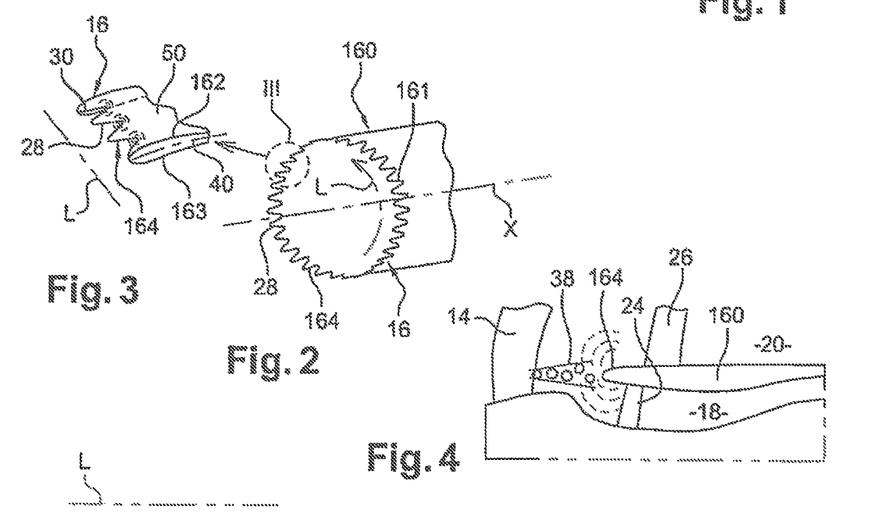
FIG. 2 shows the upstream zone (slat) of the partition wall between the primary and secondary flows, with a solution in accordance with the invention.
FIG. 3 can be either detail III of FIG. 2, or a local serrated profile lineline diagram on what may be a helicopter blade, a blade of the fan, the rotor or the downstream guide vane, leading edge slat or aircraft wing flap.
FIG. 4 corresponds to the detail IV of FIG. 1.

In FIG. 2, we can visualize more precisely the front part 161 of the separator slat 16, which includes the leading edge 164 located furthest upstream and at which the outer wall 162 of the separator slat 16 meets the inner wall 163 of the separator slat 16, the upper wall 162 forming the inner shell of the secondary jet 20.

In the present text, axial refers to anything extending along or parallel to the longitudinal axis (X) of rotation of the concerned part of the turbomachine, the axis being in principle the main axis of rotation of the turbomachine. Anything radial (axis Z) and circumferential is that which extends radially to the X axis and around it, respectively. All that is radially with respect to the X axis is internal or inner and external or outer. Thus, the inner wall 163 is the radially inner wall of the separator slat 16. Moreover, any references to upstream and downstream are to be considered in connection with the flow of gases in the (part of the) turbine engine under consideration: these gases enter upstream and exit downstream, generally circulating parallel to the aforementioned longitudinal axis of rotation.

In addition, the attached drawings, and the descriptions relating to them, have been defined with reference to the conventional orthogonal reference mark X-Y-Z, with the X axis as defined above.

The separator slat 16 is hollow: the outer face of the wall 162 serving as the radially inner boundary to the outer annular air passage 20 receiving the secondary flow while the inner face of the wall 163 serves as the radially outer boundary to the inner annular air passage 18 receiving the primary flow.

The lower wall 163 of the separator slat 16 forms the outer shell of the low-pressure compressor 22.

Although the axial offset (X) downstream of the IGVs 24 from the leading edge 164 of the separator slat 16 is less than that of the OGVs 26 from the same leading edge 164, the portion of the front part 161 directly adjacent to the leading edge 164 of the separator slat 16 is clear.

For the induced effect of aero-acoustic management by limiting the noise generated by this area, this leading edge 164 can therefore be expected to have a serrated profile lineline 28 with a succession of teeth 30 and depressions 32, as shown in the examples in FIGS. 5-11, for example.

But structures other than on a turbomachine, such as the turbojet 10, may be affected by the solution of the invention and therefore have a leading edge 164 with a profile line 28 showing serrations including a succession of teeth 30 and depressions 32.

Figure 9:
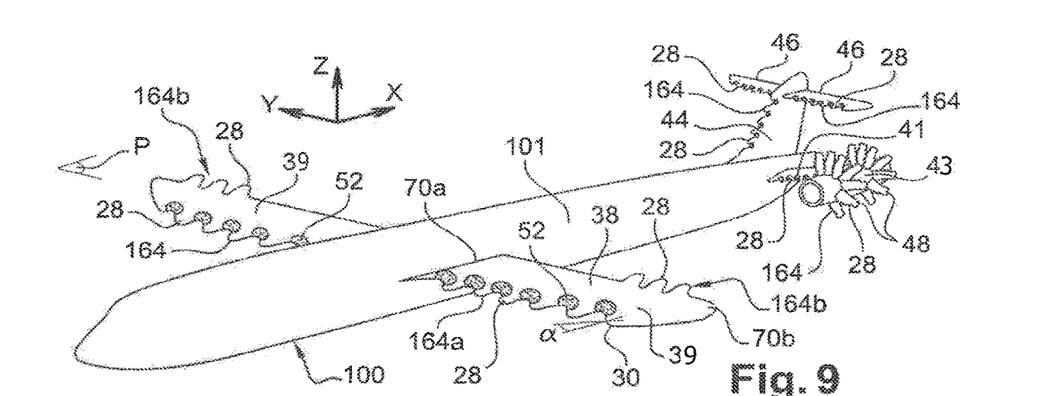
FIG. 9 schematises an aircraft bearing structures according to the invention.

FIG. 9 shows an aircraft 100 on which profiled structures with such a serrated profile line 28 are present, on the leading edge, on the wings 39, on a pylon 41 supporting an engine 43 of the aircraft, on a fin 44, a stabilizer 46, a propeller or blade 48 of an open rotor.

Furthermore, FIG. 3 shows a localized serrated profile line 28 on what may be identified as 50, a helicopter blade, a fan blade, of the rotor or the rectifier, a leading edge slat or an aircraft wing flap.

All these aerodynamic profiles have in common that they generate a boundary layer on the downstream surface, and therefore a turbulent flow.

Figures 5, 6:
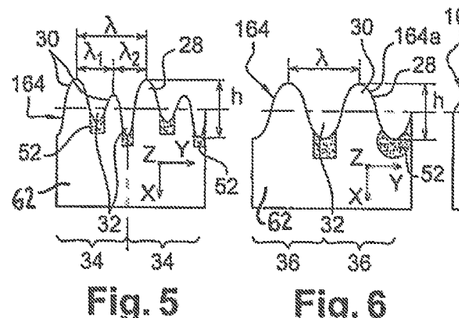
FIGS. 5-8 show various serrated profiles shapes according to the invention.
Figures 7, 8:
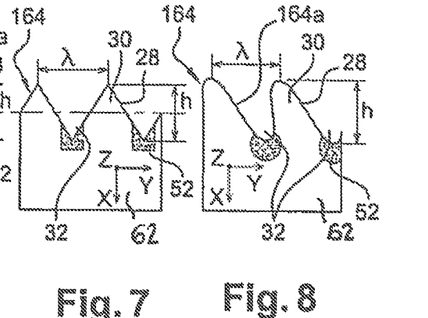

Whatever the application, for the serrated profile line 28, we will consider that it presents undulations that define:

along a direction (L) of elongation of the leading edge 164, an elementary geometry which repeats itself, two identical (or quasi-identical, when two consecutive teeth have small variations in geometry, to +/−25%) undulations of two successive elementary geometries, such as 34, 36 FIGS. 5-6, along said direction L having between them, in this direction, a distance, λ (in m), and a maximum amplitude, h (in m), perpendicular to this direction L.

The maximum amplitude h is defined as the maximum distance, along the perpendicular to this direction L, between the top—the most prominent if any—of teeth 30 and the bottom of the depressions 32—the deepest if any—, as shown in FIG. 5 under the assumption of an elementary geometry with several, preferably two undulations—two different teeth 30 and two different depressions 32.

It is also specified that:

the direction L is the direction along which the leading edge line 164a extends, which can be confused with the leading edge 164 when viewed along its entire length. This direction L can be straight (e.g. in the case of a wing, daggerboard, stabiliser), or curved, or even closed in on itself (possible case of a propeller, fan blade, rotor or rectifier blade, or the separator slat 16), the direction of the maximum amplitude, h, may typically be parallel to the general X axis (FIG. 2, FIG. 9 in part); but it may also be oriented in another direction, for example in the case of a helicopter blade (in which case the direction is a priori perpendicular to the Z axis).

In accordance with the invention, in order to attenuate locally intense pressure fluctuations, at least one porous, acoustically absorbent region 52 is provided on the profile structure concerned, which is located towards the bottom of the depressions 32.

Thus, these porous acoustically absorbent regions 52 form locally bottoms for the depressions 32 and thus define, with the parts of the body 62 of the profile structure they occupy, the serrated profile line at the leading edge and/or the trailing edge of said profile structure. As usual in this field, the body 62 still provides the coherence, the essential shape and the rigidity of the profiled structure and thus essentially defines the profiled structure, as can be seen by way of example in the figures.

It was found that to promote this attenuation, it may be preferable that the (geometric) centre of the (each) region 52 with acoustic treatment or porous surface (whether rectangular, elliptical, or other) be located at a distance d (in m) downstream (AV) from the leading edge of the airfoil 164/line 164a, at the bottom of the depressions 124 such that:

$d=h/10$, within 30%.

In order to reach most of the region with high pressure fluctuations, it is furthermore proposed that the porous acoustically absorbent region 52 under consideration should have:

- in the direction of the leading and/or trailing edge line 164a (i.e. In the direction of the wingspan or elongation), two limits separated by a distance a (in m) such that a is equal to one third of said distance between two consecutive tooth tips, to within 30%,
- in the direction of the chord 40, two limits separated by a distance b (in m) such that $b=h/3$, within 30%.

Figure 10:
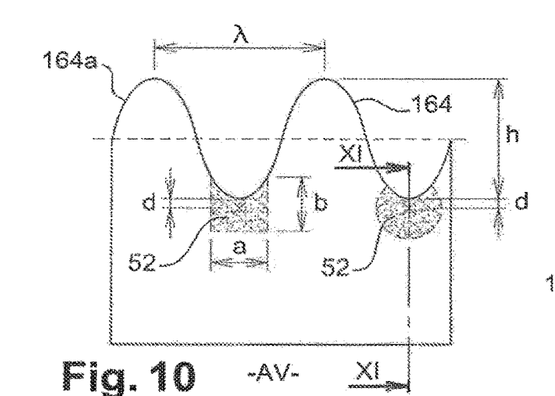
FIG. 10 is an enlarged detail of the solution in FIG. 6.
Figure 11:
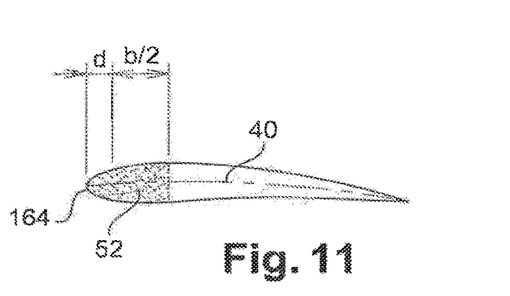
FIG. 11 shows section XI-XI.

FIGS. 10 and 11 show this. We see that the distance d is to be taken parallel to "h", perpendicular to the direction L (typically at the deepest part of the depression 32), and that $d=b/2$.

Lengths a and b are used to dimension the edges of rectangles or other shapes where the surface is acoustically treated. In the area where a is of the order of one third of said distance between two consecutive tooth tips and where the fluctuations in wall pressure have been found to be greatest, the effect of porosity via the acoustically absorbent structure must be effective.

The indicated margins of (+/−) 30% are intended to remove technical uncertainties/imprecisions.

In the claimed applications, the aim is to obtain a significant reduction in the surface area of the structure/part under consideration, and thus in the aerodynamic losses, compared to what it would have been without the solution of the invention, thus having an effect on broadband noise reduction. The porous surface or acoustic treatment targets the place where the interaction noise with wake turbulence is generated. Thus, a major contribution is considered to be that of optimising the surface to be treated in order to reduce acoustic levels.

In relation to the example in FIG. 5, where the elementary geometry is multi-corrugated, two in the example, the distance λ following the direction L is supplemented by other distances following the same direction L, here two, λ1, λ2, relating to the distances between two consecutive vertices of different but successive teeth 30.

In accordance with the above-mentioned preferred rules, it will be considered preferable here, for the reasons already indicated, that: $a=\lambda 1/3$ or $a=\lambda 2/3$ (within 30%), whichever is the greater distance, so here we will prefer $a=\lambda 1/3$ (within 30%).

From a practical point of view, several technical solutions with an impact on the surface of the structure in the acoustically treated region 52 can be foreseen.

Two of them have been chosen to reconcile effectiveness in reducing the acoustic response at the level of the depressions 32 and technical mastery, including in terms of maintenance.

Figure 12:
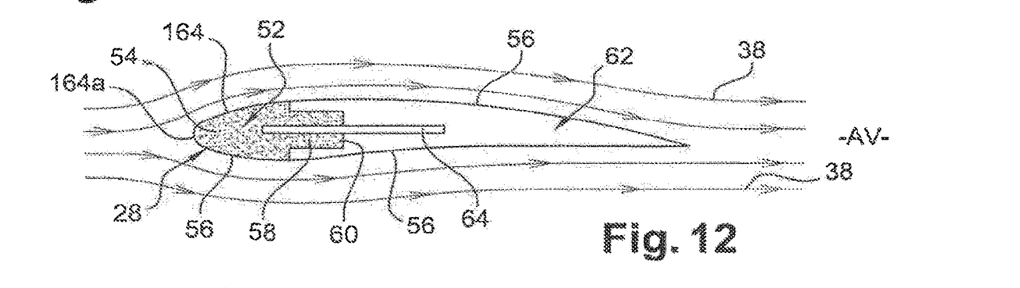
FIGS. 12-13 show, in the same section as in FIG. 11, ways of creating a porous region on a clamping profile conforming to the invention, and air flow lines.

In the solution shown in FIG. 12, the porous acoustically absorbent region 52 comprises a porous foam 54, which may be metallic, having pores of cross-section (in m) less than said distance a/4 or b/4. An alternative is that the pores should be less than ¹⁄₁₀ mm in section.

The porous foam 54 is present on the surface (outer) 56 towards said profiled leading edge 164—where it could then define the shape of the profile—and may occupy a significant part of the thickness of the profiled structure, or even all of this thickness, as shown in the figure.

In order to hold this mass of foam, it can be expected to have a protruding tooth shape 58 towards the downstream (AV), fixed, for example glued, in a frontal depression 60 of the body 62 of the structure, which could for example be the pylon 41.

One or more bars 64 could furthermore anchor the foam mass with its tooth 58 in the body 62.

Figure 13:
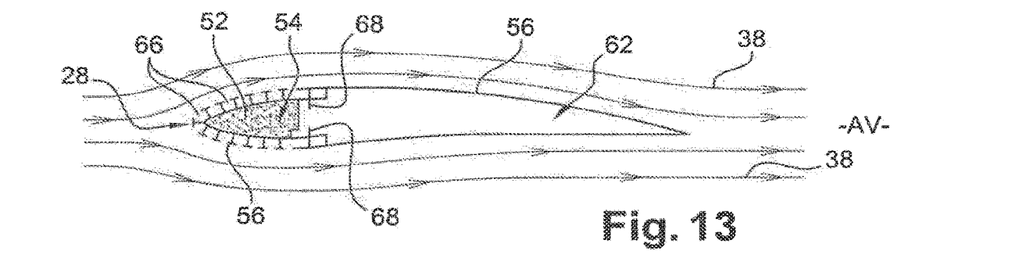

In the solution shown in FIG. 13, the porous acoustically absorbent region 52 comprises, on the surface 56 of the profiled structure, a material 66 with micro-perforated sheet metal or resonant cavities covering a porous foam 54 having pores with a cross-section (in m) less than a/4 or b/4. An alternative is also that the pores should be less than ¹⁄₁₀ mm in section.

A Helmholtz resonator can thus be formed at the location of this porous, acoustically absorbent region 52.

With both material 66 and foam 54 on the surface, a surface finish 56 compatible with low aerodynamic losses can be achieved.

Screws 68 could secure the fixation of material 66 in the body 62 of the structure.

Figure 14:
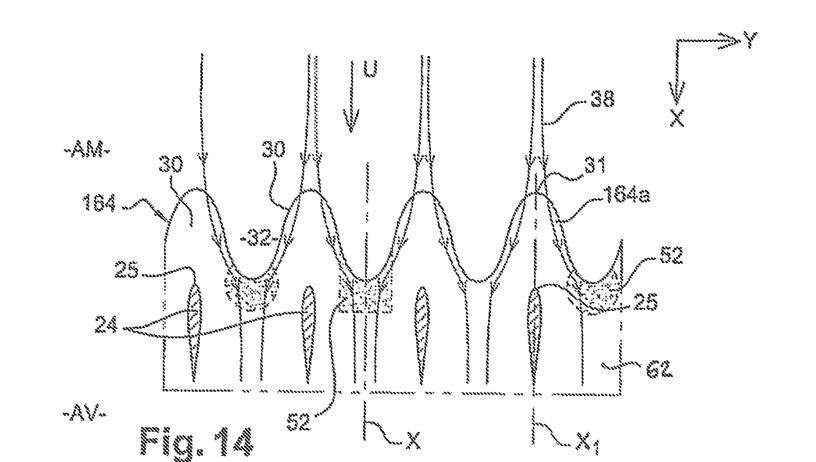
FIGS. 14-17 schematise serrated profiles according to the invention, and airflow lines (FIGS. 15-16).
Figures 15, 16:
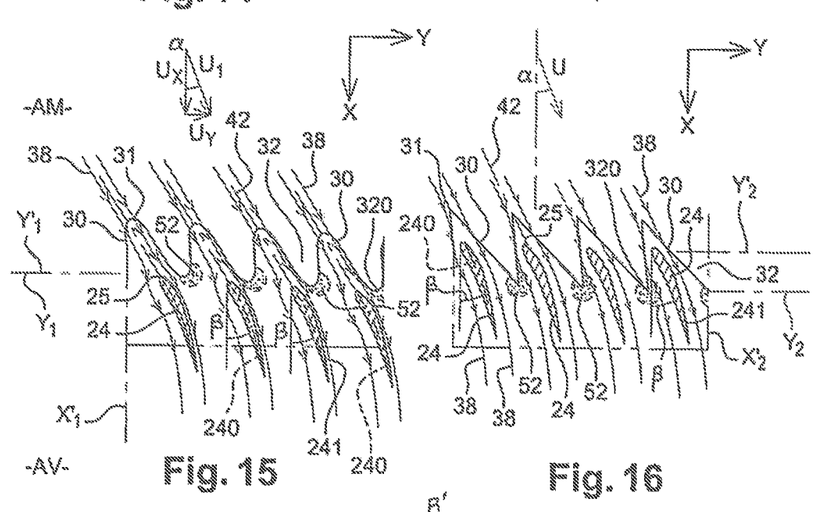

In connection with FIGS. 14-16, we will now return to the particular case of application to IGV 24 of the solution of the invention, with its porous acoustically absorbent regions 52.

In order to benefit from favourable aerodynamics, in particular at the air inlet of the low-pressure compressor 22, it is suggested that around the X axis, at least some of the depressions 32 of the serrated profile lineline 28 be angularly offset (circumferentially) in relation to the angular position of the IGV blades 24, so that these depressions 32 are interposed between two first IGV blades 24 circumferentially successive, as shown.

In these figures, the IGV 24 are even placed axially (X) in the continuity of teeth 30; more precisely each IGV 24 has been placed substantially in alignment, along the X axis, with the top of tooth 30 which precedes it upstream (AM).

In FIG. 14, this alignment is parallel to the general X axis. And teeth 30, which each have a top 31, are individually symmetrical there with respect to a parallel to the X axis, this parallel passing through the top 31 of the tooth 30 considered (see the parallel X1 for example).

In FIGS. 15-16, the IGV 24 are inclined in the X-Y plane with respect to the X axis; angle β. The teeth 30 are, circumferentially around this X axis, each inclined at the same angle β (but this angle could vary), in the same direction as the common IGV 24. The influence of the rotation of fan 14, which is assumed to rotate in the positive direction of the Y axis, has been taken into account here (see FIG. 1 and arrowhead in the L direction in FIG. 2).

FIG. 9, the angle of inclination of the profile 28 in serrations is marked a to indicate that, especially when not arranged downstream of a fan, the angle θ will not necessarily be respected, but that the angle of inclination α here takes into account the direction of the air flow arriving on the profile 28.

An angle α, β or even β' (see FIG. 17 below) between 30 and 60°, preferably between 35 and 45°, would be appropriate, given the initial results of tests carried out. This is therefore not limiting.

Thus, both the (leading edges of the) IGV 24 and the (leading edges of the) teeth 30 are in fact generally facing the air stream 38 whose overall oblique orientation U is the result of its components Ux following X and Uy following Y, taking into account the here agreed direction of rotation of fan 14.

Teeth 30 are individually axially non-symmetrical in relation to a parallel (see X'1 and X'2 FIGS. 10-11) to the general axis X, again through the top 31 of the tooth in question.

The purpose of these positions can be considered to be twofold. First, it is to avoid the interaction between the accelerated and turbulent flow produced in depressions 32 and the leading edge 25 of the IGVs (FIGS. 14-16). This can indeed contribute significantly to the broadband noise of the low-pressure compressor 22. Secondly, this technical solution can be used to optimise the air intake of the low-pressure compressor 22 and to reduce any aerodynamic losses.

As shown in FIGS. 15-16, these first blades/IGV 24 may individually exhibit a line 240 of average camber along their chord, to account for the influence of fan 14 rotation.

The angle of inclination of the flow produced by fan 14 depends on the engine speed, i.e. the speed of the fan. Therefore, consideration is being given to orienting teeth 30 in the direction of the average IGV camber or the camber at the leading edge 164. The angle values selected can be averaged along the wingspan or elongation of the IGVs, or take the values of the IGV camber at the blade tip.

As illustrated and in this example, the upper surface 241 is directed in the positive Y direction, the lower surface on the opposite side.

In order to further limit the acoustic impact on the IGV 24 of the swirling air flow that the fan 14 thus generates downstream, it is also proposed, as shown in FIGS. 15-16, that the teeth 30 be, circumferentially around said general axis X, oriented globally in the direction of a tangent 42 to said line 240 of mean camber of the IGV 24 blades, at the level of their leading edges 25. The tangent is at a ($\beta$) non-zero angle to the direction of the general axis (X) of the turbomachine.

An advantage is then to align the teeth 30 in the direction of the IGV camber and again to be able to adapt the geometry of the air inlet of compressor 22 to its environment. The direction of the air flow downstream of fan 12 depends on its rotation speed, so aligning the teeth in the direction of the IGVs (which are a fixed part) could be a good compromise between variable speeds and geometries to be fixed.

It should be noted, however, that the direction of flow upstream of the IGV blades (or the teeth of the separator nozzle 16 for that matter) will not necessarily be aligned with the camber of the IGVs.

Systematically, along the general X axis, in the preferred embodiments shown, teeth 30 are located upstream from the leading edges 2 of the IGV 24 blades, as can be seen in the figures.

However, for a dimensional limitation that may exist between the leading edge of the slat and the IGV blades (typically of the order of 1-5 cm), as well as to have the possibility to increase the size/amplitude of the teeth 30, it is proposed that, still in this direction of the X axis, the bottoms 320 of the depressions 32 of the serrated profile lineline 28 belong at least for some of them to a first surface, transverse to said X axis, marked Y1 FIG. 15 and Y2 FIG. 16, positioned at (FIG. 15) or further downstream (AV; FIG. 16) than a second surface also transverse to the X axis, marked Y'1 FIG. 15 and Y'2 FIG. 16, to which belong at least some of the leading edges 25 of the IGV blades 24. In spite of the illustrations, this is a priori independent of the shape of the tops of teeth 30 and the bottoms 320 of the depressions 32.

In this respect, the teeth 30 and depressions 32 of the serrated profile lineline 28 will individually present a wavy shape, with rounded tops (FIG. 15) or sharp tops (FIG. 16), in order to promote effective noise reduction by minimising the mechanical stresses supported by this geometry.

As for the shape of the side walls, marked 300 in FIG. 16 of these teeth 30 and depressions 32, they can be individually and locally presented as straight (FIG. 16), in order to favour the decorrelation of the noise sources along the leading edge and to facilitate the manufacture of this geometry.

We will now come back to the inclination of the airfoil structure, in the case of a structure having, in the direction of its leading edge line 164a, opposite ends 70a, 70b, and thus a kind of span (like the length of the wing or that of the pylon 41), even if one (at least) of these ends is a root, as on a wing, see example in FIG. 9 where the considered structure is—substantially—linear along the Y-axis.

In such cases (wings, blades, propellers, pylon, dagger boards . . . ) it should be noted that the inclinations of the teeth 30 will be favourably oriented each and all towards one of these ends (called second end), whether it is, for example for a wing, the root 70a or the free end 70b.

In the case of "wingspan" profiled structures, the angle a will be located in the general plane of the structure, such as plane P which contains the X-Y axes for the wings 39 in FIG. 9.

It is also possible that the inclinations of teeth 30 may vary along the span/elongation (direction L).

It should also be noted that the above comments in relation to the figures only refer to leading edge situations. However, trailing edges could be concerned, alternatively or in addition, such as (lines of) trailing edges 164b with profile 28 in wing serrations, as shown in FIG. 9, other turbomachine or aircraft structures provided with trailing edges could also be concerned by the invention. As a trailing edge on an annular wall, there is a nozzle at the outlet of the primary and secondary jets.

At the trailing edge, the noise source can typically be related to the interaction between turbulence in the boundary layer of the profile and this trailing edge.

Figure 17:
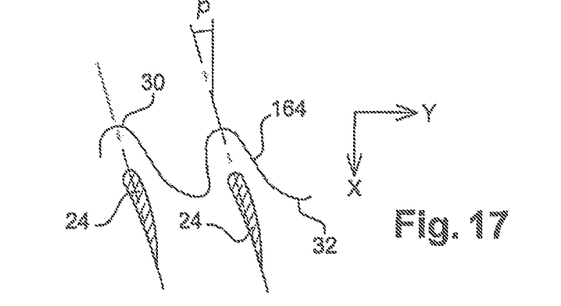

In FIG. 17, a situation has also been schematised in which, since the turbomachine is always with an upstream fan (14 above) and has a general axis (X) around which this upstream fan can rotate, the teeth 30 are, circumferentially around the general axis (X), individually inclined (angle $\beta'$) in the direction of the mean camber of the first IGV 24 blades.

It can also be noted that, in FIG. 15, the teeth 30 are also individually inclined circumferentially around the X-axis in the direction of the camber of the IGV blades at their leading edges 25. This angle, marked $\beta$, of the teeth 30 will be identical or not to the angle $\alpha$ of the velocity vector U1 which marks the general direction of the flow downstream of the fan.

On the attached figures, it will have been understood that those where a velocity vector (U, U1, . . . ) is shown upstream of the leading edge illustrate cases where the teeth are oriented towards the direction of the flow.

The invention claimed is:

1. A profiled air flow structure comprising:
a body having an upstream leading edge and/or a downstream trailing edge;
porous acoustically absorbent regions; and
along the upstream leading edge and/or the downstream trailing edge, a serrated profile line showing a succession of teeth and depressions,
wherein the porous acoustically absorbent regions locally form bottoms for the depressions where the porous acoustically absorbent regions occupy a part of the body to define, together with the body, the serrated profile line at the upstream leading edge and/or the downstream trailing edge, wherein each porous acoustically absorbent region has a geometric center located downstream of the bottom of the depressions in the upstream leading edge or upstream of the bottom of the depressions in the downstream trailing edge.

2. The profiled structure according to claim 1, further comprising:
a chord in which:
along the chord, the serrated profile line has a maximum amplitude, "h", and
the geometric center of each porous acoustically absorbent region is located at a distance "d" downstream of the upstream leading edge or upstream of the downstream trailing edge, at the bottom of the depressions such that:

$d=h/10$, within 30%.

3. The profiled air flow structure according to claim 1, further comprising:
a chord in which:
along the upstream leading edge or the downstream trailing edge, the serrated profile line has a distance between two consecutive tooth tips,
along the chord, the serrated profile line has a maximum amplitude, "h", and
the porous acoustically absorbent region has:
along the upstream leading edge and/or the downstream trailing edge, two limits separated by a distance "a" such that a is equal to one third of said distance between two consecutive tooth tips, to within 30%,
along the chord, two limits separated by a distance "b" such that b=h/3, within 30%.

4. The profiled air flow structure according to claim 2, wherein:
along the upstream leading edge or the downstream trailing edge, the serrated profile line has a distance between two consecutive tooth tips, and
the porous acoustically absorbent region has:
along the upstream leading edge and/or the downstream trailing edge, two limits separated by a distance "a" such that a is equal to one third of said distance between two consecutive tooth tips, to within 30%,
along the chord, two limits separated by a distance "b" such that b=h/3, within 30%.

5. The profiled air flow structure according to claim 1, which is one of an aircraft structure and a front fan turbomachine structure.

6. The profiled air flow structure according to claim 1, wherein the profiled air flow structure is one selected from the following:
an aircraft wing, an aircraft wing slat, an aircraft wing flap, an aircraft engine support pylon, a fin, an aircraft stabilizer, a helicopter blade, a propeller, one of the following parts of a turbomachine adapted to power an aircraft:
a leading and/or trailing edge of an annular air flow separating wall, downstream of a front fan of the turbomachine, between a primary flow and a secondary flow,
inlet guide vanes extending in the primary flow,
outlet guide vanes extending in the secondary flow.

7. The profiled air flow structure according to claim 3, wherein the porous acoustically absorbent region comprises a porous foam having pores with a cross-section smaller than a quarter of said distance "a" or a quarter of said distance "b", on a surface of the profiled air flow structure at said upstream leading edge.

8. The profiled air flow structure according to claim 3, wherein the porous acoustically absorbent region comprises, on a surface of the profiled air flow structure, one of a micro-perforated sheet material and a resonant cavity material covering a porous foam having pores with a cross-section smaller than a quarter of said distance "a" or a quarter of said distance "b".

9. The profiled air flow structure according to claim 1, wherein the porous acoustically absorbent region comprises a Helmholtz resonator.

10. The profiled air flow structure according to claim 1, in which individually the teeth and depressions of the serrated profile have a wavy shape, with respective tops which are all rounded or all sharp.

11. The profiled air flow structure according to claim 1, wherein individually the teeth and depressions of the serrated line profile have a shape with locally rectilinear side walls.

12. The profiled air flow structure according to claim 1 in which, along the upstream leading edge and/or the downstream trailing edge, the teeth of the serrated profile, which each have an apex, are individually non-symmetrical with respect to a perpendicular to the upstream leading edge passing through the corresponding tooth.

13. The profiled air flow structure according to claim 1 in which, along the upstream leading edge and/or the downstream trailing edge, from a first location to a second location, the teeth of the serrated profile, each having an apex, are individually inclined towards the second location.

14. The profiled air flow structure according to claim 13, further comprising:
a span along the upstream leading edge and/or the downstream trailing edge between a first end and a second end,
wherein the inclinations of the teeth are each oriented towards one of said first end and second end.

15. A turbomachine for aircraft, the turbomachine comprising the profiled structure according to claim 1.

16. A turbomachine for aircraft, said turbomachine being traversed by an air flow flowing from upstream to downstream, comprising the profiled air flow structure according to claim 13 and being such that:
the turbomachine comprises a front fan and has a general axis about which the front fan can rotate,
the front fan is adapted to rotate in a predetermined direction about said general axis, such that the airflow downstream of the front fan is generally obliquely oriented with respect to said general axis, and
the teeth are inclined circumferentially around said general axis towards the generally oblique orientation of the air flow downstream of the front fan, to face it.

17. A turbomachine for an aircraft, the turbomachine comprising the profiled air flow according to claim 6, and wherein:
  the turbomachine comprises a front fan and has a general axis about which the front fan can rotate, and
  the teeth are, circumferentially around said general axis, individually inclined:
    along an average camber of said inlet guide vanes, or
    along a camber at an upstream leading edge of said inlet guide vanes.

18. The profiled structure according to claim 4, wherein the porous acoustically absorbent region comprises a porous foam having pores with a cross-section smaller than a quarter of said distance "a" or a quarter of said distance "b", on a surface of the profiled air flow structure at said upstream leading edge.

19. The profiled air flow structure according to claim 4, wherein the porous acoustically absorbent region comprises, on a surface of the profiled air flow structure, one of a micro-perforated sheet material and a resonant cavity material covering a porous foam having pores with a cross-section smaller than a quarter of said distance "a" or a quarter of said distance "b".

* * * * *